(No Model.)
F. S. SHIRLEY.
GLASS MAKER'S MOLD.
No. 337,204. Patented Mar. 2, 1886.
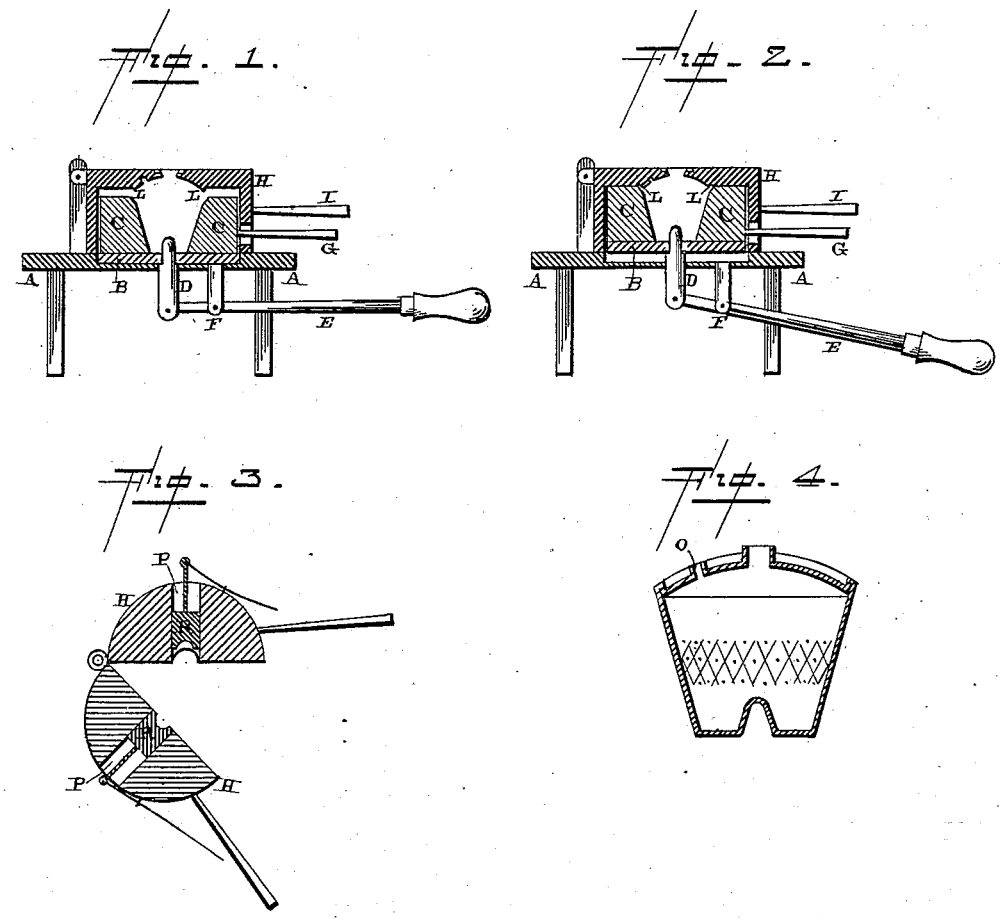

UNITED STATES PATENT OFFICE.

FREDERICK S. SHIRLEY, OF NEW BEDFORD, MASSACHUSETTS.

GLASS-MAKER'S MOLD.

SPECIFICATION forming part of Letters Patent No. 337,204, dated March 2, 1886.

Application filed December 15, 1882. Serial No. 79,361. (No model.)

*To all whom it may concern:*

Be it known that I, FREDK. S. SHIRLEY, of New Bedford, in the county of Bristol and State of Massachusetts, have invented certain new and useful Improvements in Glass-Makers' Molds; and I do hereby declare the following to be a full, clear, and exact description of the invention, such as will enable others skilled in the art to which it pertains to make and use it, reference being had to the accompanying drawings, which form part of this specification.

My invention relates to an improvement in molds for blowing lamp-bowls; and it consists in the combination of an outer inclosing-case having a circular flange formed around on the under side of its top, with the mold which is placed inside of this case, and which is made vertically movable in the frame or case, while the lamp-bowl is being blown, as will be more fully described hereinafter.

The object of my invention is to produce a mold in which lamp-bowls can be blown, and the oil-guard formed in its top at the same time by pressing the top of the bowl downward, and thus compress and thicken the glass at those points where it would be weakest if the bowl were made entirely by blowing.

Figure 1 is a vertical section of a mold embodying my invention, showing the mold at the bottom of the inclosing-case. Fig. 2 is a similar view of the same, showing the mold raised upward so as to form the flange. Fig. 3 is a plan view of the inclosing-case, showing the slides which form the neck of the lamp-bowl. Fig. 4 is a vertical section of the lamp-bowl formed by means of my mold.

A represents a suitable table, which is raised any suitable distance above the ground by means of legs, and which has a circular recess or cavity formed at its center upon its top. In this cavity is placed the plate B, upon which rests the mold C, in which the lamp-bowl is formed.

Through the bottom of the table A is formed an opening through which passes the sleeve D, which has its upper end to bear against the under side of the plate for the purpose of raising it and the mold placed upon its top. To the lower end of the sleeve is secured the lever E, which is fulcrumed at F, and to its inner end is secured a vertical moving rod of any desired shape or size, which passes through the sleeve and which forms a socket in the bottom of the lamp-bowl in the usual manner. When the inner end of the lever is forced upward, the upper end of the sleeve raises the plate B and the mold C upward, and the rod at the same time forms a socket of any desired depth in the bowl.

The mold A is made in two parts in the usual manner, which are hinged together and provided with the handles G for opening and closing them. This mold may be of any desired size or shape, and may either have a plain or an ornamental surface according to the kind of bowl that is to be produced.

Placed upon the top of the table A and inclosing the mold C is the shell H, which is also formed of two parts which are hinged together and which are provided with handles I for the purpose of opening and closing them. Through one side of this shell H is formed a suitable slot through which the handles of the mold C project. The interior of this shell H is somewhat higher than the top of the mold C, so that when the mold C is at its lowest position there is a space of any desired width left between the two. Formed on the under side of the top of this shell H is a circular flange, L, of any desired shape that may be preferred, and which flange is placed in such a relation to the opening in the top of the mold C that when the mold C is raised upward there is enough space left between the flange and the top edge of the mold to allow the glass which is to form the flange around the top of the lamp-bowl to be forced up in between the two, as shown in Fig. 2. Also formed in the under side of this top is a suitable recess, O, in which the filling-tube is to be formed.

In the top of the inclosing-shell H are made the two grooves P, in which the slides R, for forming the neck upon the lamp-bowl, are placed. These slides may be operated in any suitable manner, as they are merely to be pushed inward around the neck of the bowl, for the purpose of forming it before the glass is broken above them. As these slides have their inner ends so shaped as to make the lower end of the neck larger than the upper end, they must be drawn outward before the bowl can be removed.

The molten glass having been introduced into the mold and both the mold and the inclosing-case closed, the bowl is then blown and while the glass is yet hot and being shaped the operator presses down upon the outer end of the lever E, so as to force the mold C upward against the top of the shell and thus depress the top of the bowl downward in respect to the bowl a distance equal to the space that is left between the mold C and the under side of the top of the shell. The top edge of the recess in which the bowl is formed being beveled away, as shown, a portion of the glass which forms the top of the bowl is forced downward by the flange until it touches that part of the glass which forms the side of the bowl, and the two are then forced together so as to form practically one thickness. This gives the flange around the edge of the bowl a sufficient thickness to prevent the glass from being readily broken and to prevent it from cracking in the process of annealing. Where this flange or projection around the edge of the bowl is blown in the usual manner, the glass at this part is so thin that the lamps are of but little value, owing to their frailty. Where the glass is thus compressed, however, so as to form the double thickness, the bowls are made of sufficient strength to withstand any ordinary use. As these flanges can be formed at the same time that the lamp is being blown, it will be seen that there is very little, if any, additional cost in their manufacture, while every bowl is perfectly formed, even by inexperienced workmen.

I do not limit myself to the construction here shown, for this may be varied. Instead of having the mold itself raised upward against the top of the inclosing-case a top may be moved down upon the bowl which has just been blown, for the purpose of forming the flange in the same manner that is accomplished by raising the bowl upward.

I am well aware that a plunger has been forced upward through the bottom of a glass mold for the purpose of forming a recess in the bottom of the article being formed, and this I disclaim. My invention differs from this in having an outer inclosing-case and a movable portion of the mold inclosed therein, the case and mold being so formed as to form a compressed flange on the top of the lamp-bowl.

Having thus described my invention, I claim—

1. The combination of the two-part shell, the movable standard, the two-part mold within the shell and resting upon the standard, and the top to the shell, the mold and said top being constructed, substantially as described, to form a depression on the top of the article being molded when the mold is moved against the top.

2. The combination of the two-part shell, the movable standard, the two-part mold within the shell resting upon and adapted to be raised by the standard, the top to the shell, and the two-part slide to the top, substantially as specified.

3. The combination of a vertically-moving mold and inclosing-shell having a flange formed on its under side, and a mechanism for raising the mold upward, substantially as shown.

4. The combination of a vertically-moving mold having the upper edge of the opening or cavity formed in it beveled away, with an inclosing-shell having a flange formed on the under side of its top, and a mechanism for forcing the mold upward, substantially as described.

5. In a glass-blower's mold, the movable mouth or neck formers arranged to release the article by opening, substantially as shown.

6. The glass-blower's mold composed of the inclosing-case H, made in two parts, the mold C, having its upper edge beveled away, the rod D, by means of which the mold C is raised upward, and the operating-lever E, the top of the inclosing-case being provided with a flange, L, which corresponds to the cut-away edge of the mold C, substantially as shown.

In testimony whereof I affix my signature in presence of two witnesses.

FREDK. S. SHIRLEY.

Witnesses:
RIMI TURCOT,
ALFRED SAUNDERS.